- 11 — GELATINO SILVER HALIDE EMULSION
- 12 — GELATIN + BIS(3,4-DIPHENYL-1,2-TETRAMETHYLENE-5-PYRROLE) TRIMETHINCYANINE PERCHLORATE, SULFONATED
- 13 — SUPPORT

- 14 — GELATIN + BIS(3-METHYL-4-PHENYL-1,2-TETRAMETHYLENE-5-PYRROLE) TRIMETHINCYANINE PERCHLORATE
- 15 — GELATINO SILVER HALIDE EMULSION
- 16 — SUPPORT

JOSEPH BAILEY
INVENTOR.

United States Patent Office 3,497,503
Patented Feb. 24, 1970

3,497,503
LIGHT-FILTERING DYES FOR PHOTOGRAPHIC ELEMENTS
Joseph Bailey, Wealdstone, Harrow, Middlesex, England, assignor to Eastman Kodak Company, Rochester, N.Y., a corporation of New Jersey
Original application July 3, 1963, Ser. No. 292,550, now Patent No. 3,294,539, dated Dec. 27, 1966. Divided and this application Aug. 8, 1966, Ser. No. 590,123
Int. Cl. C09b 23/00
U.S. Cl. 260—240.65                              7 Claims

ABSTRACT OF THE DISCLOSURE

Novel light-filtering cyanine dyes useful, for example, in light-sensitive photographic elements are prepared from 1,2-tetramethylenepyrroles. Illustrative dyes include, for example, bis(3-methyl-4-phenyl-1,2-tetramethylene-5-pyrrole)trimethincyanine perchlorate, bis(3,4-diphenyl-1,2 - tetramethylene - 5 - pyrrole)trimethincyanine perchlorate, sulfonated, and (1-ethyl-2,5-dimethyl-3-pyrrole) (3,4 - diphenyl - 1,2 - tetramethylene-5-pyrrole)methincyanine perchlorate.

---

Figure 1:
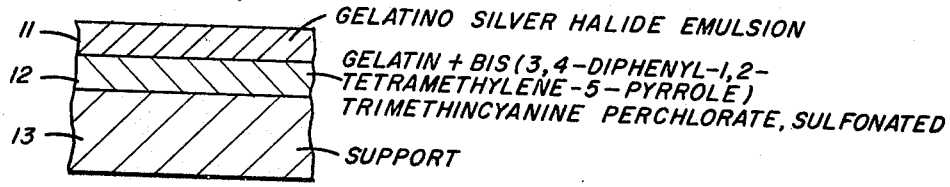

This application is a division of copending U.S. patent application Ser. No. 292,550, filed July 3, 1963, now U.S. Patent 3,294,539, issued Dec. 27, 1966.

This invention is related to 1,2-tetramethylenepyrroles, polymethin dyes derived from 1,2-tetramethylenepyrroles and in particular to light-sensitive photographic elements containing dyes derived from 1,2-tetramethylenepyrroles.

It is known to use light-screening dyes in photographic elements. The light-screening dyes may be coated in a hydrophilic layer over the light-sensitive layer or layers, in a light-sensitive layer over one or more light-sensitive layers, in a hydrophilic layer between light-sensitive layers, in a hydrophilic layer coated on the support either between the support and light-sensitive layers or on the opposite side of the support from the light-sensitive layers.

Cyanine and merocyanine dyes are known which contain either an $\alpha$-pyrrole or $\beta$-pyrrole nucleus attached to the conjugated chain. Certain of these dyes are useful in photography as light-screening substances.

The numerous stages required for preparing the intermediate necessary to make the $\alpha$-pyrrole dyes render the end-products costly to manufacture.

The starting materials required for making the $\beta$-pyrrole dyes are normally 2,5-diketones. The simplest of these, acetonyl acetone is readily available but the higher analogues are difficultly accessible.

New light-screening dyes are desired for use in photographic elements.

It is, therefore, an object of my invention to provide 1,2-tetramethylenepyrroles which are valuable for making new dyes valuable for use in photographic elements.

Another object is to provide a new class of light-screening dyes derived from 1,2-tetramethylenepyrroles for use in photographic elements, many of said dyes being readily bleached and washed out of the element during photographic processing.

Another object is to provide photographic elements with hydrophilic colloid layers containing my dyes that are derived from 1,2-tetramethylenepyrroles.

Another object is to provide an inexpensive and relatively simple method for producing the 1,2-tetramethylenepyrrole intermediates used to make my dyes.

Still further objects will become evident from a consideration of the following specification and claims.

These and other objects are accomplished according to my invention by the preparation of my 1,2-tetramethylenepyrroles, the preparation of my dyes from these intermediates, and use of my dyes in photographic elements. The 1,2-tetramethylenepyrrole intermediates of my invention include those represented to advantage by the formula:

(I)
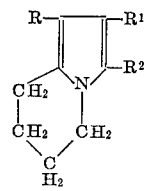

wherein R, $R^1$ and $R^2$ are each selected from the class consisting of the hydrogen atom, an alkyl group, e.g., methyl, ethyl, propyl, isopropyl, butyl, hexyl, octyl, hydroxyethyl, 4-hydroxy-butyl, 2-hydroxylbutyl, carboxymethyl, carboxyethyl, 3-carboxy-propyl, sulfomethyl, sulfomethyl, sulfobutyl, benzyl (i.e., phenylmethyl), phenethyl, etc., an aryl group, e.g., phenyl, naphthyl, 4-sulfophenyl, 3 - sulfophenyl, 2 - sulfophenyl, 4 - sulfonaphthyl, 2-sulfonaphthyl, 4-carboxyphenyl, 2-carboxyphenyl, 4-acetamidophenyl, 3-acetamidophenyl, 4-methylphenyl, 2-ethylphenyl, 3-methoxyphenyl, 4-ethoxyphenyl, etc., a heterocyclic group, e.g., a thienyl group (such as, thienyl, 3-sulfomethylthienyl, 4 - carboxymethylthienyl, 3,4,5-trimethylthienyl, 3,5 - dimethylthienyl, 4,5 - dimethylthienyl, etc.), a thiazole group (such as thiazole, 4-methylthiazole, 4,5 - dimethylthiazole, 4 - sulfomethylthiazole, 5-carboxymethylthiazole, etc.), a benzothiazole group (such as, benzothiazole, 4 - chlorobenzothiazole, 5 - chlorobenzothiazole, 6-methylbenzothiazole, etc.), an oxazole group (such as, 4-methyloxazole, 5-methyloxazole, 4-phenyloxazole, etc.), a benzoxazole group (such as, benzoxazole, 5-chlorobenzoxazole, 4-methylbenzoxazole, etc.), the carboxy group, an alkoxycarbonyl group, e.g., ethoxycarbonyl, propoxycarbonyl, etc., and an aryloxycarbonyl group, e.g., phenoxycarbonyl, etc., such that at least one of the groups R, $R^1$ and $R^2$ represents the hydrogen atom.

My 1,2-tetramethylenepyrroles are prepared from a compound having the formula:

(II)
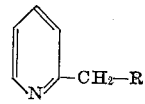

by heating it with a compound having the formula:

(III)
$$R^1-\underset{\underset{O}{\|}}{C}-\underset{\underset{R^2}{|}}{C}HW$$

wherein R, $R^1$ and $R^2$ are as described previously, and W is a halogen atom, e.g., chlorine, bromine, iodine, etc., to form the quaternary salt (IV)
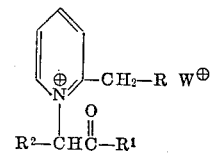

which is then cyclized by treating with an alkali metal bicarbonate followed by hydrogenation of the cyclization product using Raney nickel catalyst.

The 1,2-tetramethylenepyrroles of Formula I are used to advantage to produce dyes of my invention including the cyanine dyes represented by the formulas:

(V)
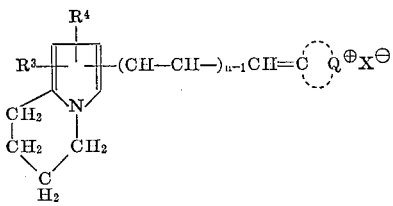

(VI)
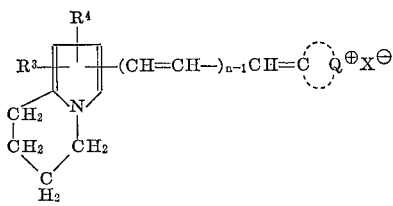

and
(VII)
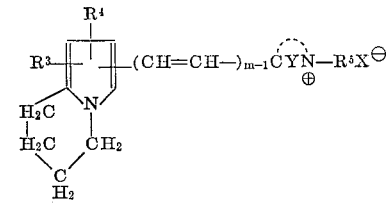

wherein $R^3$ and $R^4$ are each selected from the class consisting of the hydrogen atom an alkyl group, e.g., methyl, propyl, hexyl, octyl, hydroxyethyl, 4-hydroxybutyl, carboxymethyl, carboxyethyl, sulfomethyl, sulfobutyl, benzyl, phenethyl, etc., an aryl group, e.g., phenyl, naphthyl, 4-sulfophenyl, 3-sulfophenyl, 2-sulfophenyl, 4-carboxyphenyl, 2-carboxyphenyl, 4-acetamidophenyl, 3-acetamidophenyl, 4-methylphenyl, 2-methoxyphenyl, 4-ethoxyphenyl, etc., a heterocyclic group, e.g., a thienyl group (such as thienyl, 3-sulfomethylthienyl, 4-carboxymethylthienyl, 3,4,5-trimethylthienyl, 4,5-dimethylthienyl, 3,5-dimethylthienyl, etc.), a thiazole group (such as thiazole, 4 - methylthiazole, 4,5 - dimethylthiazole, 4-sulfomethylthiazole, 5-carboxymethylthiazole, etc.), a benzothiazole group (such as, benzothiazole, 4-chlorobenzothiazole, 5-chlorobenzothiazole, 6 - methylbenzothiazole, etc.), an oxazole group (such as, 4-methyloxazole, 5-methyloxazole, 4-phenyloxazole, etc.), a benzoxazole group (such as, benzoxazole, 5-chlorobenzoxazole, 4-methylbenzoxazole, etc.), the carboxy group, an alkoxycarbonyl group, e.g., ethoxycarbonyl, propoxycarbonyl, etc., and an aryloxycarbonyl group, e.g., phenoxycarbonyl, etc., $n$ represents an integer from 1 to 3, and Q represents the non-metallic atoms necessary to complete a heterocyclic nucleus, such as those of the pyrrole series (e.g., pyrrole, 2,5 - dimethylpyrrole, 2,5 - dimethyl - 1 - phenylpyrrole, 2,5 - diethyl - 1-phenylpyrrole, 2,5-dimethyl-1-n-propylpyrrole, 2,5-dimethyl-1-laurylpyrrole, 4-carbethoxy-3,5-dimethylpyrrole, 1-benzylpyrrole, 2,5-dimethyl-4-sulfomethylpyrrole, etc.), those of the indole series (e.g., indole, 1,2-dimethylindole, 1,2,5-trimethylindole, 1,2,6-trimethylindole, 5-chloro-1,2-dimethylindole, 5-carbethoxy-1,2-dimethylindole, 6-sulfo-1,2-dimethylindole, etc.), those of the pyrrocoline series (e.g., pyrrocoline, 2,3-dimethylpyrrocoline, 2,4-diethylpyrrocoline, 3,4-di-n-hexylpyrrocoline, 2,3-diphenylpyrrocoline, 2-p-carboxyphenyl-3-methylpyrrocoline, etc.), etc.; $X^\ominus$ is an acid anion, such as chloride, bromide, iodide, benzenesulfonate, p-toluenesulfonate, methylsulfate, ethylsulfate, thiocyanate, perchlorate, acetate, propionate, etc.; Z represents the non-metallic atoms required to complete a 1,2-tetra-methylenepyrrole as defined by Formula I; $m$ represents an integer of from 2 to 3; Y represents the non-metallic atoms necessary to complete a heterocyclic nucleus such as those of the thiazole series (e.g., thiazole, 4-methylthiazole, 4 - phenylthiazole, 5 - methylthiazole, 5-phenylthiazole, 4,5-dimethylthiazole, 4,5-diphenylthiazole, 4-(2-thienyl)thiazole, etc.), those of the benzothiazole series, (e.g., benzothiazole, 4 - chlorobenzothiazole, 5 - chlorobenzothiazole, 6 - chlorobenzothiazole, 7 - chlorobenzothiazole, 4-methylbenzothiazole, 5-methylbenzothiazole, 6-methylbenzothiazole, 5-bromobenzothiazole, 6-bromobenzothiazole, 4 - phenylbenzothiazole, 5 - phenylbenzothiazole, 4 - methoxybenzothiazole, 5 - methoxybenzothiazole, 6 - methoxybenzothiazole, 5 - iodobenzothiazole, 6-iodobenzothiazole, 4-ethoxybenzothiazole, 5-ethoxybenzothiazole, tetrahydrobenzothiazole, 5,6 - dimethoxybenzothiazole, 5,6 - dioxymethylenebenzothiazole, 5 - hydroxybenzothiazole, 6-hydroxybenzothiazole, etc.), those of the naphthothiazole series, (e.g., $\alpha$ - naphthothiazole, $\beta$-naphthothiazole, 5-methoxy-$\beta$-naphthothiazole, 5-ethoxy-$\beta$ - naphthothiazole, 8 - methoxy - $\alpha$ - naphthothiazole, 7-methoxy - $\alpha$ - naphthothiazole, etc.), those of the thionaphtheno-7′,6′,4,5-thiazole series (e.g., 4′-methoxythianaphtheno-7′,6′,4,5-thiazole, etc.), those of the oxazole series (e.g., 4-methyloxazole, 5-methyloxazole, 4-phenyloxazole, 4,5 - diphenyloxazole, 4 - ethyloxazole, 4,5 - dimethyloxazole, 5-phenyloxazole, etc.), those of the benzoxazole series (e.g., benzoxazole, 5-chlorobenzoxazole, 5-methylbenzoxazole, 5-phenylbenzoxazole, 6-methylbenzoxazole, 5,6 - dimethylbenzoxazole, 4,6 - dimethylbenzoxazole, 5-methoxybenzoxazole, 5-ethoxybenzoxazole, 5-chlorobenzoxazole, 6 - methoxybenzoxazole, 5 - hydroxybenzoxazole, 6-hydroxybenzoxazole, etc.), those of the naphthoxazole series (e.g., $\alpha$ - naphthoxazole, $\beta$ - naphthoxazole, etc.), those of the selenazole series, (e.g., 4-methylselenazole, 4-phenylselenazole, etc.), those of the benzoselenazole series (e.g., benzoselenazole, 5-chlorobenzoselenazole, 5 - methoxybenzoselenazole, 5-hydroxybenzoselenazole, tetrahydrobenzoselenazole, etc.), those of the naphthoselenazole series (e.g., $\alpha$-naphthoselenazole, $\beta$-naphthoselenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6 - methoxyquinoline, 7 - methylquinoline, 8-methylquinoline, etc.), those of the 1-isoquinoline series (e.g., isoquinoline, 3,4-dihydroisoquinoline, etc.), those of the 3-isoquinoline series (e.g., isoquinoline, etc.), those of the 3,3-dialkylindolenine series (e.g., 3,3-dimethylindolenine, 3,3,5-trimethylindolenine, 3,3,7-trimethylindolenine, etc.), the 2- and 4-pyridine series (e.g., pyridine, 5-methylpyridine, etc.), those of the imidazole series (e.g., imidazole, 4-phenylimidazole, 4,5-dimethylimidazole, etc.), those of the benzimidazole series (e.g., benzimidazole, 4,5-dichlorobenzimidazole, etc.) and those of the naphthimidazole series (e.g., $\alpha$ - naphthimidazole, $\beta$ - naphthimidazole, 5-methoxy-$\beta$-naphthimidazole, etc., $R^5$ represents an alkyl group having from 1-12 carbon atoms, e.g., methyl, ethyl, propyl, amyl, dodecyl, $\beta$-hydroxyethyl, $\gamma$-hydroxypropyl, $\beta$-methoxyethyl, allyl, benzyl, $\beta$-phenylethyl, $\beta$-carboxyethyl, carboxymethyl, $\beta$ - acetoxyethyl, $\gamma$ - acetoxypropyl, carbomethoxymethyl, $\beta$-carbethoxyethyl, etc.

In general the dyes of my invention are prepared by reacting a compound of Formula I with an appropriate intermediate in an organic solvent, such as, methanol, ethanol, etc., in the presence of a mineral acid, such as hydrochloric acid, hydrobromic acid, perchloric acid, or an organic acid, such as acetic acid. The intermediates used to advantage for the symmetrical dyes of Formula VI are ethylorthoformate for monomethin dyes, $\beta$-ethoxyacroleinacetal for trimethin dyes and sodium glutaconic aldehyde for pentamethin dyes. These intermediates are well known in the art.

The unsymmetrical dyes of Formula V are prepared to advantage by reacting a compound of Formula I with an intermediate having the formula:

(VIII)
$$H-\overset{O}{\overset{\|}{C}}(-CH=CH)_{n-1}-\overset{\cdot\cdot}{C}\,Q$$

wherein $n$ and $Q$ are as defined previously, in the presence of an organic solvent and an acid as described.

The unsymmetrical dyes of Formula VII are prepared to advantage by reacting a compound of Formula I with an intermediate having the formula:

(IX)
$$C_6H_5N-(CH=CH-)_{m-1}\overset{Y}{\underset{O=C-CH_3}{C}}=N-R^5\ X^{\ominus}$$

wherein $m$, $Y$, $R^5$ and $X^{\ominus}$ are as defined previously, in the presence of an organic solvent and an acid as described.

The intermediates of Formulas VIII and IX are well known in the art of dye synthesis.

When a sulfonated dye is desired, the 1,2-tetramethylenepyrrole is added portionwise to a mixture of concentrated sulfuric acid and oleum and heated cautiously on a steam bath. When the sulfonation reaction is completed, the reaction mixture is cooled, diluted with methanol and the appropriate intermediate is added. The dye formed is then poured into a solution of the appropriate acid HX.

The following typical dyes will serve to illustrate my invention.

DYE 1

Bis(3-methyl-4-phenyl-1,2-tetramethylene-5-pyrrole)-trimethincyanine perchlorate 3-methyl - 4 - phenyl-1,2-tetramethylenepyrrole (1 g.), β-ethoxyacrolein diethyl acetal (1 cc.) in ethanol (10 cc.) were treated with perchloric acid (1 cc., 60%) and the mixture heated on the steam bath for 15 minutes. The dye product was precipitated by chilling the reaction mixture and diluting with water. Chilling and scratching caused solidification. The dye was collected and washed well with water. The yield of dye was 0.5 g. It had an adsorption maximum in methanol at 596 mμ.

DYE 2

Bis(3,4-diphenyl-1,2-tetramethylene-5-pyrrole)-trimethincyanine perchlorate (sulfonated)

3,4-diphenyl-1,2-tetramethylenepyrrole (2 g.) was added portionwise to a mixture of concentrated sulfuric acid (2 cc.) and 20% oleum (2.5 cc.) and the mixture was cautiously heated on the steam bath for 30 minutes (a drop of reaction solution was then diluted with about 5 cc. water and complete solution was observed). The reaction mixture was cooled and cautiously diluted with methanol (12.5 cc.) and allowed again to cool. β-ethoxyacrolein acetal (1 cc.) was added with stirring when the mixture became green and changed rapidly to pure blue. Stirring was continued for 10 minutes. Then the methanol was removed in vacuo applying minimum of heating. The dye solution was poured into a solution of 60% perchloric acid (1 cc.) in water (12 cc.) and the dye was precipitated by pouring into much acetone. The dye was collected, washed with acetone and dried. It weighed 1 g. and had an absorption maximum in water at 614 mμ.

DYE 3

Bis(5-methyl-4-phenyl-1,2-etramethylene-3-pyrrole)-trimethincyanine perchlorate 5-methyl - 4 - phenyl-1,2-tetramethylenepyrrole (1 g.), β-ethoxyacrolein acetal (1 cc.), perchloric acid (1 cc., 60%) in ethanol (10 cc.) were heated on the steam bath for 10 minutes during which time a magenta dye was formed. It was precipitated by pouring into water. The dye was collected and washed with water and dried. It weighed 1 g. and had an absorption maximum in methanol at 551 mμ.

DYE 4

Bis(5-methyl-4-phenyl-1,2-tetramethylene-3-pyrrole)-trimethincyanine perchlorate (sulfonated)

This dye was prepared by the method used for dye 2 but using an equivalent amount of 5-methyl-4-phenyl-1,2-tetramethylenepyrrole. The product dye 4 had an absorption maximum in 50% aqueous methanol at 552 mμ.

DYE 5

Bis(4-p-acetamidophenyl-3-methyl-1,2-tetramethylene-5-pyrrole)-methincyanine perchlorate 4-p-acetamido - phenyl - 3 - methyl-1,2-tetramethylenepyrrole (0.54 g.), ethyl orthoformate (0.3 cc.) and acetic acid (5 cc.) were stirred together for 10 minutes at room temperature. The solution was then poured into a solution of 60% perchloric acid (1 cc.) in water (20 cc.). The precipitated dye was collected and washed well with water and dried. The yield of reddish-blue crystals was 0.35 g. The dye had an absorption maximum in methanol at 547 mμ.

DYE 6

Bis(4-phenyl-1,2-tetramethylene-5-pyrrole)methincyanine perchlorate

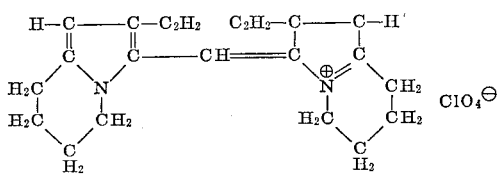

4-phenyl-1,2-tetramethylenepyrrole (0.4 g.), ethyl orthoformate (0.3 cc.) and acetic acid (7 cc.) were stirred together at room temperature for 10 minutes. The dye solution was then poured into a solution of 60% perchloric acid (1 cc.) in water (20 cc.). The precipitated dye was collected by filtration, washed with water and dried. The yield of deep maroon crystals was 0.4 g. The dye had an absorption maximum in methanol at 535 m$\mu$.

DYE 7

(1-ethyl-2,5-dimethyl-3-pyrrole)(3,4-diphenyl-1,2-tetramethylene-5-pyrrole)methincyanine perchlorate

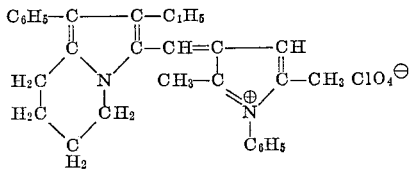

3,4-diphenyl-1,2-tetramethylenepyrrole (0.54 g.), 1-ethyl-2,5-dimethyl-3-pyrrolealdehyde (0.3 g.), conc. HCl (0.2 cc.) and ethanol (10 cc.) were heated under reflux for 5 minutes on a steam bath. The solution was then chilled and poured into a mixture of 60% perchloric acid (1 cc.) in water (20 cc.). The precipitated dye was collected, washed with water and dried. The yield of orange crystals was 0.8 g. The dye had an absorption maximum in methanol at 484 m$\mu$.

DYE 8

(1-ethyl-2,5-dimethyl-3-pyrrole)(2-methyl-3-phenyl-1,5-tetramethylene-4-pyrrole)methincyanine perchlorate

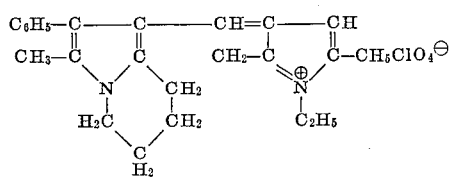

Prepared analogously to Dye 7 using 2-methyl-3-phenyl-1,5-tetramethylenepyrrole in place of 3,4-diphenyl-1,2-tetramethylenepyrrole. The dye was obtained in 85% yield as yellow crystals having absorption maximum in methanol at 444 m$\mu$.

DYE 9

(1-ethyl-2-benzoxazole)(3,4-diphenyl-1,2-tetramethylene-5-pyrrole)tetramethincyanine iodide

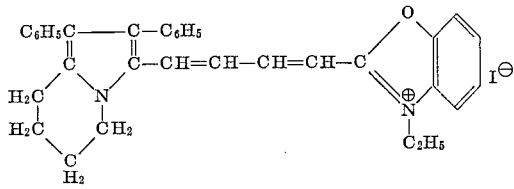

2-(4′-acetanilido-butadienyl)benzoxazole ethiodide (0.46 g.) was dissolved in hot acetic acid (20 cc.) and the solution was filtered. To the hot filtrate was added 3,4-diphenyl-1,2-tetramethylenepyrrole (0.27 g.) and the solution was refluxed for 5 minutes. The reaction mixture was chilled and the separated dye was collected by filtration, washed with acetic acid and then with methanol. The yield of deep blue crystals was 0.1 g. The dye had an absorption maximum in methanol at 614 m$\mu$.

DYE 10

(1-ethyl-2-benzoxazole)(4-p-acetamidophenyl-3-methyl-1,2-tetramethylene-5-pyrrole)tetramethincyanine iodide

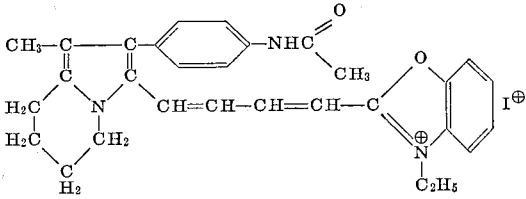

Prepared similarly to Dye 9 using 4-p-acetamidophenyl-3-methyl-1,2-tetramethylenepyrrole (0.27 g.) in place of 3,4-diphenyl-1,2-tetramethylenepyrrole (0.27 g.). The yield of dark blue crystals was 0.07 g. The dye had an absorption maximum in methanol at 604 m$\mu$.

Another dye derived from a 1,2-tetramethylenepyrrole of my invention is 1,3-diethyl-hexahydro-5-(3-methyl-4-phenyl-1,2-tetramethylene-5-pyrryl)-allylidene-4,6-dioxo-2-thiopyrimidine.

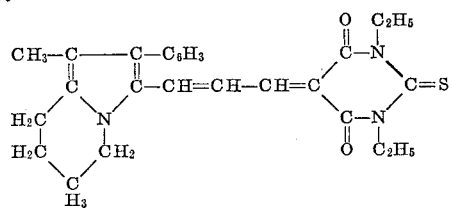

3-methyl-4-phenyl-1,2-tetramethylenepyrrole (1 g.), 1,3-diethyl-4,6-dioxo-hexahydro-5-(3-ethoxyallylidene)-2-thiopyrimidine (1 g.) were suspended in ethanol (30 cc.), treated with concentrated hydrochloric acid (1 cc.) and heated on the steam bath for 15 minutes. The dye separated from solution. The reaction mixture was chilled, the dye collected by filtration and washed with methanol. It was recrystallized from methanol/benzene mixture as glistening purple needles. The yield of dye was 0.5 g. It had an absorption maximum in chloroform at 560 m$\mu$.

The preparation of representative intermediates of Formula I is illustrated as follows:

3-methyl-4-phenyl-1,2-tetramethylenepyrrole.—1-methyl-2-phenylpyrrocoline (5 g.) in ethanol (100 cc.) was hydrogenated in the presence of Raney nickel at room temperature in a low pressure glass hydrogenator. The reaction took 14 hours after which the hydrogen uptake ceased. Raney nickel was filtered out and the filtrate was concentrated and the residue distilled in vacuo. The fraction boiling at 206°–211° C./12–15 mm. was collected. It weighed 3 g. (60%).

5-methyl-4-phenyl-1,2-tetramethylenepyrrole.—Similarly this intermediate was prepared in 75% yield of colorless needles crystallized from methanol, M.P. 68° C.

3,4-diphenyl-1,2-tetramethylenepyrrole.—This intermediate was prepared by hydrogenating the corresponding pyrrocoline in a mixture of methanol and benzene. An 80% yield of the product was crystallized as colorless crystals from ethanol, M.P. 87° C.

My dyes are used to advantage in hydrophilic colloid layers in light-sensitive photographic elements as light-screening layers coated over one or more light-sensitive layers, between light-sensitive layers or as antihalation layers coated on the support either between the support and light-sensitive layer or on the opposite side of the support from the light-sensitive layer. Two or more of my dyes may be used together or my dyes may be used with other dyes.

Hydrophilic colloids used to advantage in making my light-screening and antihalation layers include natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, etc., and other hydrophilic colloids that are used in the layers of photographic elements.

The selection of substituents for my dyes will depend upon the medium in which the dyes are employed. If, for instance, in an anti-halation backing layer the backing is removed during development, any of my dyes may be used that are removed and bleached during development. If the vehicle, however, is not removed during development, it is preferable to select dyes containing acid groups so that the dye in the form of its bleached product will be washed out during development and dye staining is avoided during subsequent fixation, washing and drying.

For the preparation of filter, overcoating or antihalation layers, the dyes are dissolved in suitable solvents, e.g., water, methanol, ethanol, acetone, cellosolve, and other well known solvents. The dye solution is added to the hydrophilic colloid, mixed thoroughly and then coated on a support or emulsion layer using any of the known coating techniques. The optimum concentration of dye used will depend upon the particular dye, the particular light-sensitive silver halide emulsion, and whether the dye is to be used in a light-screening layer, or in an anti-halation layer. The optimum dye concentration can be determined readily by methods well known in the art.

Photographic elements containing my light-screening or anti-halation layers may be coated on any of the usual photographic support materials including, for example, paper, glass, cellulose acetate, cellulose nitrate, synthetic film-forming resins, e.g., polystyrene, polyesters, polyamides, etc.

My elements may contain any of the light-sensitive silver halide emulsions, e.g. silver chloride, silver bromide, silver chlorobromide, silver bromoiodide, silver chlorobromoiodide, etc., which may be further sensitized if desired by adding the usual sensitizers including optical sensitizers. The silver halides are dispersed in gelatin or any of the other hydrophilic colloids mentioned previously.

The following examples will further illustrate the use of my dyes.

EXAMPLE 1

A solution of Dye 1 in methanol was added to a solution of polyvinylphthalate in a mixture of methanol, acetone and methyl cellosolve and coated on a sheet of glass at the rate of 15 mg. of the dye per square foot. The coating was dried. The dried coating was treated for the usual development time in a delevoper solution having the composition:

| | |
|---|---|
| N-methyl-p-aminophenol sesqui sulfate _____g__ | 3.0 |
| Sodium sulfite, desiccated _____g__ | 90.0 |
| Sodium bisulfite _____g__ | 2.0 |
| Hydroquinone _____g__ | 6.0 |
| Sodium carbonate, monohydrated _____g__ | 14.0 |
| Potassium bromide _____g__ | 2.0 |
| Water to make _____liter__ | 1 |

The dye was completely bleached by this treatment.

EXAMPLE 2

Example 1 was repeated using Dye 2, Dye 3 and Dye 4 in separate hydrophilic colloid layers. Each of the dried coatings were completely bleached by treatment in the developer solution of Example 1.

My Dyes 2 and 4 when coated in a layer between a support and a light-sensitive layer were completely bleached by the developer solution during the processing operation.

Similarly other dyes of my invention are valuable for use in light-screening or anti-halation layers of photographic elements.

Figure 2:
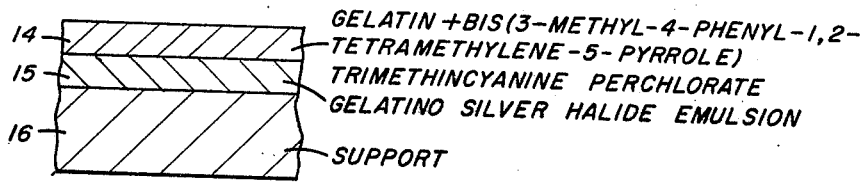

The accompanying drawing FIG. 1 and FIG. 2 will still further illustrate my invention.

FIG. 1 shows an exaggerated cross sectional view of a photographic element consisting of support 13 having coated on it in succession light filtering-layer 12 consisting of gelatin containing by Dye 2, and gelatino silver halide emulsion layer 11.

FIG. 2 shows an exaggerated cross sectional view of a photographic element consisting of support 16 having coated on it in succession gelatino silver halide emulsion layer 15 and light-filtering layer 14 consisting of gelatin containing Dye 1.

The novel 1,2-tetramethylenepyrroles of my invention are produced by an inexpensive and relatively simple method. These compounds are valuable intermediates for making a new class of light-screening dyes that are valuable for use in hydrophilic layers of photographic elements. Many of my dyes are completely bleached by treatment in the conventional developer solutions used for image development.

The invention has been described in detail with particular reference to preferred embodiments thereof, but it will be understood that variations and modifications can be effected within the spirit and scope of the invention as described hereinabove and as defined in the appended claims.

I claim:
1. A dye selected from the class consisting of dyes having the formulas:

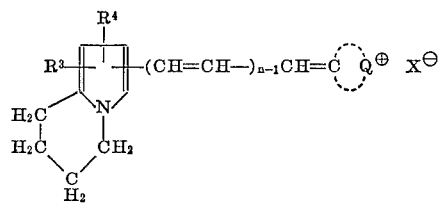

II

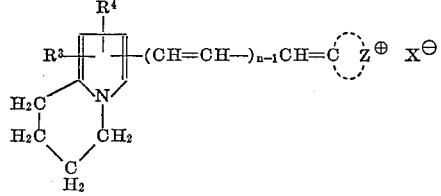

and

III

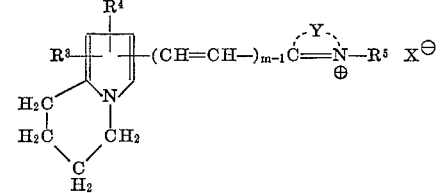

wherein $R^3$ and $R^4$ are each selected from the class consisting of a hydrogen atom, an alkyl group having 1 to 8 carbon atoms, a carboxyalkyl group having 2 to 4 carbon atoms, a sulfoalkyl group having 1 to 4 carbon atoms, benzyl, phenethyl, the phenyl group, a tolyl group, a methoxyphenyl group, an ethoxyphenyl group, a sulfophenyl group, a carboxyphenyl group, an acetamidophenyl group, a naphthyl group, a sulfonaphthyl group, the carboxy group, a (low carbon alkoxy)carbonyl group, a phenoxycarbonyl group, a thienyl group, a thiazole group, a benzothiazole group, an oxazole group and a benzoxazole group, $n$ represents an integer of from 1 to 3, Q represents the nonmetallic atoms necessary to complete a heterocyclic nucleus selected from the class consisting of a pyrrole nucleus, an indole nucleus and a pyrrocoline nucleus, Z represents the nonmetallic atoms needed to complete a 1,2-tetramethylenepyrrole group, $X^\ominus$ represents an acid anion, $m$ represents an integer of from 2 to 3, Y represents the nonmetallic atoms necessary to complete a heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, a 3,3-dialkylindolenine nucleus, a pyridine nucleus, an imidazole nucleus, a benzimidazole nucleus and a naphthimidazole nucleus, and $R^5$ represents an alkyl group having 1–12 carbon atoms, a low carbon hydroxyalkyl group having at least 2 carbon atoms, β-methoxyethyl, allyl, benzyl, phenethyl, carboxymethyl, β-carboxyethyl, β-acetoxyethyl, γ-acetoxypropyl, carbomethoxymethyl and β-carbethoxyethyl, wherein a sulfonic acid group is directly attached to the nucleus of a 1,2-tetramethylenepyrrole group.

2. A dye of claim 1 having Formula I.
3. A dye of claim 1 having Formula II.
4. A dye of claim 1 having Formula III.
5. The dye bis(3,4-diphenyl-1,2-tetramethylene-5-pyrrole)trimethincyanine perchlorate, sulfonated.
6. The dye bis(5-methyl-4-phenyl-1,2-tetramethylene-3-pyrrole)trimethincyanine perchlorate, sulfonated.
7. A dye compound in accordance with claim 1 selected from the dye compounds which in their perchlorate salt form are bis(3,4-diphenyl-1,2-tetramethylene-5-pyrrole)-trimethincyanine perchlorate, sulfonated and bis(5-methyl-4-phenyl-1,2-tetramethylene-3 - pyrrole)trimethincyanine perchlorate, sulfonated.

References Cited
UNITED STATES PATENTS
2,571,775  10/1951  Sprague _____ 260—240.65

OTHER REFERENCES
Beilstein's Handbuch der Organischen Chemie, 4th Ed., vol. 20, page 129, system #3071, Springer, Berlin, Germany (1935).

Stepanov et al., Zhur. Obsch. Khim, vol. 30, pages 2850 to 2853 (1960).

Patterson et al., J. Org. Chem., vol. 27, pages 1652 to 1659 (May 1962).

JOHN D. RANDOLPH, Primary Examiner

U.S. Cl. X.R.
96—84; 260—240.4, 240.5, 240.6, 240.7, 240.8, 293, 297